E. L. HITE.
MEAT HANGER.
APPLICATION FILED JUNE 15, 1909.

937,679.

Patented Oct. 19, 1909.

Witnesses
William C. Liton.
J. F. Byrne.

Inventor
Ernest L. Hite.
By Victor J. Evans
Attorney

UNITED STATES PATENT OFFICE.

ERNEST L. HITE, OF BUNCETON, MISSOURI.

MEAT-HANGER.

937,679.

Specification of Letters Patent.

Patented Oct. 19, 1909.

Application filed June 15, 1909. Serial No. 502,340.

*To all whom it may concern:*

Be it known that I, ERNEST L. HITE, a citizen of the United States, residing at Bunceton, in the county of Cooper and State of Missouri, have invented new and useful Improvements in Meat-Hangers, of which the following is a specification.

My invention relates to improvements in meat hangers, and its primary object is the provision of a device of this character which shall be provided with means adapted to prevent mice from passing by way of the hanger from the support to which the hanger is secured to the meat suspended by the hanger.

A further object of the invention is the provision of a meat hanger which shall be extensible, whereby to permit the meat to be lowered for convenient inspection.

A still further object of the invention is the provision of a meat hanger which shall be simple, durable and efficient of construction, and which may be manufactured and sold at a comparatively low cost.

With the above and other objects in view, the invention consists in the construction, combination and arrangement of parts hereinafter fully described and claimed, and illustrated in the accompanying drawing, wherein:—

Figure 1:
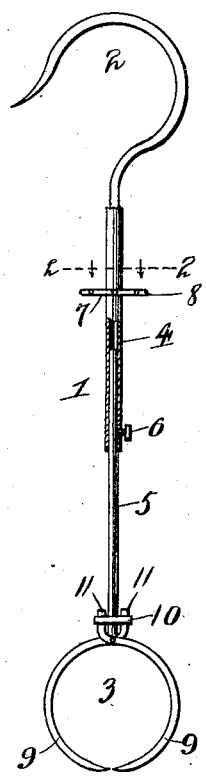
Figure 2:
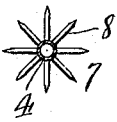
Figure 3:
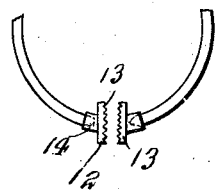

Figure 1 is a view in side elevation of a meat hanger constructed in accordance with my invention, a portion of the hollow body section being in vertical section. Fig. 2 is a sectional view taken on the horizontal plane indicated by the line 2—2 of Fig. 1, looking in the direction indicated by the arrows, the clamp being omitted, and Fig. 3 is an enlarged view in side elevation of portions of the jaws of the clamp, illustrating a slight modification therein.

Referring to the drawing by reference numerals, 1 designates the body, 2 the support engaging hook, and 3 the meat engaging clamp of my improved meat hanger. The hook 2 is secured to the upper end of the body 1, and the clamp 3 is secured to the lower end thereof. The body 1 preferably comprises telescopically connected members 4 and 5 which are adapted to be secured against relative movements by a set screw 6 mounted upon the member 4 for engagement with the member 5. As the members 4 and 5 are telescopically connected, the length of the hanger may be increased whereby to permit the meat to be lowered to permit of its being conveniently examined. A guard 7, which consists of a plurality of pointed fingers 8 secured to and extending radially from the member 4, prevents mice from passing from the support to which the hanger is secured to the meat suspended by the hanger. The clamp preferably comprises a pair of curved jaws 9 which are pivotally secured to the lower end of the body section 5. The free ends of the jaws 7 are pointed to permit the clamp to be readily and quickly engaged with the meat. The jaws 9 are secured in closed or meat engaging position by a locking member or link 10 adapted to embrace members or arms 11 formed on and extending upwardly from the jaws 9.

In practice, the hanger is secured to the piece of meat it is desired to hang up by inserting the jaws 9 in a hole formed in the meat by an awl, after which the jaws are secured in closed or meat engaging position by the locking member or link 10. After the members 4 and 5 have been adjusted to render the body the desired length, the hanger is secured to a support through the medium of the hook 2. The meat may be lowered for examination by turning the set screw 6 out of engagement with the body member 5, permitting the extension of the body. After the meat has been examined the length of the body may be shortened to again support the meat at the proper height by moving the body member 5 upwardly within the body member 6, after which the set screw 6 is turned into engagement with the body member 5 to secure the body members in their relatively adjusted positions.

When the meat is packed in cloth the jaws 9 of the clamp 3 may be provided with heads 12 which have their active faces serrated as at 13 to permit them to secure a firm grip on the cloth. The heads 13 are provided with collars 14 which receive the ends of the jaws 9.

From the foregoing description, taken in connection with the accompanying drawing, it should be apparent that I provide a meat hanger which is equipped with means adapted to prevent mice from traveling from the support to the meat by way of the hanger, one which will permit of the meat to be lowered for examination, one which is simple durable and efficient of construction, and one which may be manufactured and sold at a comparatively low cost.

Changes in the form, proportions and minor details of construction may be made within the scope of the claims without departing from the spirit or sacrificing any of the advantages of the invention.

Having thus described the invention, what I claim as new is:—

1. A meat hanger comprising telescoping members, means adapted to secure the members in adjusted position, a hook secured to one of the members, a plurality of pointed fingers secured to and extending radially from the member to which the hook is secured, and a clamp secured to the other member.

2. A meat hanger comprising a body, a hook secured to the upper end of the body, a clamp secured to the lower end of the body, and a plurality of pointed fingers secured to and extending radially from the body at a point above the clamp.

In testimony whereof I affix my signature in presence of two witnesses.

ERNEST L. HITE.

Witnesses:
S. L. RISSLER,
T. E. EDMONSTON.